(12) United States Patent
Gillula

(10) Patent No.: US 7,739,006 B2
(45) Date of Patent: Jun. 15, 2010

(54) SYSTEM AND METHOD FOR AUTONOMOUS NAVIGATION IN A RIDE VEHICLE

(75) Inventor: Jeremy Gillula, Stanford, CA (US)

(73) Assignee: Disney Enterprises, Inc., Burbank, CA (US)

( * ) Notice: Subject to any disclaimer, the term of this patent is extended or adjusted under 35 U.S.C. 154(b) by 366 days.

(21) Appl. No.: 11/821,956

(22) Filed: Jun. 25, 2007

(65) Prior Publication Data

US 2008/0189003 A1    Aug. 7, 2008

Related U.S. Application Data

(60) Provisional application No. 60/900,275, filed on Feb. 7, 2007.

(51) Int. Cl.
G01C 22/00 (2006.01)

(52) U.S. Cl. .................. 701/24; 701/1; 701/23; 701/201; 701/300; 701/301; 318/567; 318/580; 318/587; 340/435; 340/436; 340/903; 340/995.19; 342/357.01; 342/357.06; 342/357.1; 342/357.13; 342/357.14

(58) Field of Classification Search .......... 701/24
See application file for complete search history.

(56) References Cited

U.S. PATENT DOCUMENTS

| | | | | |
|---|---|---|---|---|
| 3,757,290 A * | 9/1973 | Ross et al. | ........ | 340/991 |
| 5,111,401 A * | 5/1992 | Everett et al. | ........ | 701/24 |
| 5,684,696 A * | 11/1997 | Rao et al. | ........ | 701/25 |
| 6,122,572 A * | 9/2000 | Yavnai | ........ | 701/23 |
| 6,240,367 B1 * | 5/2001 | Lin | ........ | 701/214 |
| 6,246,960 B1 * | 6/2001 | Lin | ........ | 701/214 |
| 6,275,773 B1 * | 8/2001 | Lemelson et al. | ........ | 701/301 |
| 6,429,812 B1 * | 8/2002 | Hoffberg | ........ | 342/357.1 |
| 6,532,416 B1 * | 3/2003 | Mueller | ........ | 701/207 |
| 6,799,099 B2 * | 9/2004 | Zeitler et al. | ........ | 701/23 |
| 7,305,287 B2 * | 12/2007 | Park | ........ | 701/23 |
| 7,499,775 B2 * | 3/2009 | Filippov et al. | ........ | 701/23 |
| 2005/0134440 A1 * | 6/2005 | Breed | ........ | 340/435 |
| 2005/0137786 A1 * | 6/2005 | Breed et al. | ........ | 701/200 |
| 2006/0089764 A1 * | 4/2006 | Filippov et al. | ........ | 701/23 |
| 2006/0224321 A1 * | 10/2006 | Lund et al. | ........ | 701/220 |
| 2007/0018890 A1 * | 1/2007 | Kulyukin | ........ | 342/357.14 |
| 2007/0021915 A1 * | 1/2007 | Breed et al. | ........ | 701/301 |
| 2007/0219720 A1 * | 9/2007 | Trepagnier et al. | ........ | 701/300 |
| 2007/0233371 A1 * | 10/2007 | Stoschek et al. | ........ | 701/209 |
| 2007/0271035 A1 * | 11/2007 | Stoschek et al. | ........ | 701/209 |
| 2008/0004796 A1 * | 1/2008 | Schott et al. | ........ | 701/201 |

* cited by examiner

*Primary Examiner*—Khoi Tran
*Assistant Examiner*—Jonathan Sample
(74) *Attorney, Agent, or Firm*—Farjami & Farjami LLP

(57) ABSTRACT

There is provided an autonomous navigation system for use in conjunction with a ride vehicle. The autonomous navigation system includes an on-board sensor system for generating on-board sensor data of a surrounding of the ride vehicle. According to this embodiment, the autonomous navigation system further includes a receiver module for receiving off-board sensor data of the surrounding of the ride vehicle. For example, the off-board sensor data can be generated from an off-board sensor system, which includes a plurality of off-board sensors. The autonomous navigation system includes a sensor data fusion module for performing a data fusion process on the on-board sensor data and the off-board sensor data to generate fused sensor data. The autonomous navigation system further includes a navigation module for determining a course of the ride vehicle based on the fused sensor data.

20 Claims, 4 Drawing Sheets

SYSTEM AND METHOD FOR AUTONOMOUS NAVIGATION IN A RIDE VEHICLE

RELATED APPLICATIONS

The present application is based on and claims priority to U.S. Provisional Application Ser. No. 60/900,275, filed Feb. 7, 2007, which is hereby incorporated by reference in its entirety.

BACKGROUND OF THE INVENTION

1. Field of the Invention

The present invention relates generally to vehicle autonomy. More particularly, the present invention relates to autonomous vehicles using sensor fusion technology to provide safer rides.

2. Background Art

Amusement and theme park operators continuously strive to provide their patrons with more unique, adventurous and safer rides. Today, ride vehicles that operate through theme parks follow the same path for each ride, and their operation is pre-programmed, which make the ride vehicles less attractive to the patrons. For example, some theme park vehicles run on track rails. In other examples theme park vehicles may be controlled by overhead wires. In all such situations, the paths of the ride vehicles within the park are pre-defined and cannot be altered. Moreover, such pre-defined paths of the ride vehicles can limit the types of environments or areas in which the ride vehicles can be used. For example, ride vehicles operating on tracks will undoubtedly require areas suitable for track installation, where such areas may not be available in the theme park. In other cases, the implementation of a predefined path through various areas in the theme park may not be practical due to heavy pedestrian traffic, for example.

An attractive alternative to such ride vehicles having predefined paths involves ride vehicles that are able to autonomously navigate through the theme park. However, autonomous navigation has not been extended to ride vehicles in theme parks mainly for the reason that sensing and control for the ride vehicles are performed at a single point, which is the ride vehicle itself. In other words, today's ride vehicles are not able to navigate autonomously in the theme park, due in large part to safety concerns for the riders and other pedestrians. For example, a ride vehicle can be equipped with various sensors that are configured to detect the surrounding environment of the ride vehicle as it travels. As such, safe autonomous navigation of the ride vehicle would essentially be dependent on the proper functionality of the sensors, since the ride vehicle would be completely dependent on the sensors for the detection of obstacles and more importantly, detection of other pedestrians that might be in the ride vehicle's path. Consequently, a minor failure at the ride vehicle could cause a disastrous event, which can be extremely costly for theme park operators.

Therefore, there is a strong need in the art for autonomous ride vehicles in theme parks, which can provide unique experiences for the riders from one ride to the next, while providing safety for the riders and other patrons.

SUMMARY OF THE INVENTION

There is provided systems and methods for autonomous navigation in a ride vehicle, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
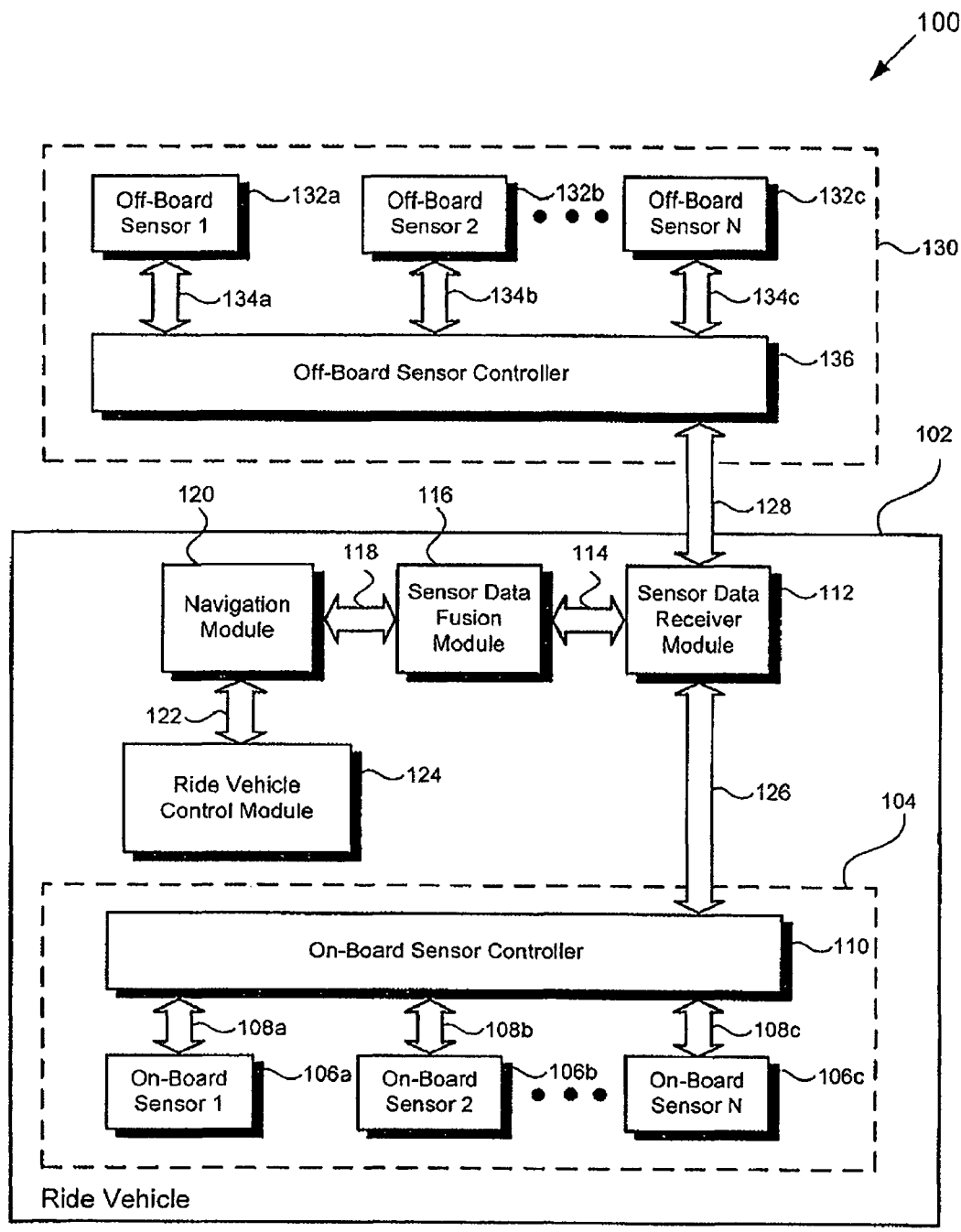
FIG. 1 illustrates a block diagram of an autonomous navigation system for use in a ride vehicle, in accordance with one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates a block diagram of autonomous navigation system 100 for use in a ride vehicle, in accordance with one embodiment of the present invention. As shown in FIG. 1, autonomous navigation system 100 includes off-board sensor system 130, on-board sensor system 104, sensor data receiver module 112, sensor data fusion module 116, navigation module 120, and ride vehicle control module 124. In the embodiment of the invention shown in FIG. 1, on-board sensor system 104, sensor data receiver module 112, sensor data fusion module 116, navigation module 120, and ride vehicle control module 124 are situated in ride vehicle 102. For example, ride vehicle 102 can be a motor vehicle capable of holding one or more passengers as part of an amusement or theme park ride or as part of a tour ride through a theme park.

As shown in FIG. 1, on-board sensor system 104 includes on-board sensor controller 110 and on-board sensors 106a, 106b, and 106c. As also shown in FIG. 1, on-board sensors 106a, 106b, and 106c are coupled to on-board sensor controller 110 via data paths 108a, 108b, and 108c, respectively. For example, data paths 108a, 108b, and 108c can each be a wireless communication link established using radio frequency signals or can each be a physical connection, such as a physical communication bus. In other embodiments, on-board sensor system 104 can include additional on-board sensors coupled to on-board sensor controller 110. Thus, in the embodiment of the invention shown in FIG. 1, on-board sensors 106a and 106b represent the first and second on-board sensors in on-board sensor system 104, respectively, while on-board sensor 106c represents the nth on-board sensor. On-board sensors 106a, 106b, and 106c can each be, for example, a camera, a laser range finder sensor, or a sound range finder sensor.

As also shown in FIG. 1, on-board sensor system 104 is included in ride vehicle 102. The on-board sensors of the invention, such as on-board sensors 106a, 106b, and 106c, can be situated at various locations on ride vehicle 102 to enable detection of the surrounding environment of ride vehicle 102. For example, if on-board sensors 106a, 106b, and 106c are laser range finding sensors, they can be situated on the external surfaces of ride vehicle 102 and can be oriented in various directions to accurately detect the surrounding environment of ride vehicle 102. Thus, on-board sensors 106a, 106b, and 106c can be used to generate on-board sensor data containing information about the surrounding environment of ride vehicle 102. For example, the on-board sensor data can contain information, which can be used to accurately map out the surrounding environment of the ride vehicle in real time and more importantly, detect particular objects, which may obstruct the path of ride vehicle 102. As shown in FIG. 1, the on-board sensor data can be communicated from on-board sensors 106a, 106b, and 106c to on-board sensor controller 110 via respective data paths 108a, 108b, and 108c.

As shown in FIG. 1, off-board sensor system 130 includes off-board sensor controller 136 and off-board sensors 132a, 132b, and 132c. Off-board sensors 132a, 132b, and 132c are coupled to off-board sensor controller 136 via respective data paths 134a, 134b, and 134c. In other embodiments, off-board sensor system 130 can include additional off-board sensors coupled to off-board sensor controller 136. Thus, in the embodiment of the invention shown in FIG. 1, off-board sensors 132a and 132b represent the first and second off-board sensors in off-board sensor system 130, respectively, while off-board sensor 132c represents the nth off-board sensor. Off-board sensors 132a, 132b, and 132c can each be, for example, a camera, a laser range finder sensor, or a sound range finder sensor.

Off-board sensor system 130 is situated apart from ride vehicle 102 and is in communication with ride vehicle 102 via datapath 128. For example, datapath 128 can be a wireless communication link established using radio frequency signals. The off-board sensors of the invention, such as off-board sensors 132a, 132b, and 132c, can be situated at locations, which enable detection of the surrounding environment of ride vehicle 102. For example, off-board sensors 132a, 132b, and 132c can be cameras situated above areas over which ride vehicle 102 might pass. Accordingly, off-board sensors 132a, 132b, and 132c can be used to generate off-board sensor data containing information about the surrounding environment of ride vehicle 102. For example, the off-board sensor data can contain information, which can be used to accurately map out the surrounding environment of the ride vehicle in real time and more importantly, detect particular objects that may obstruct the path of ride vehicle 102. As shown in FIG. 1, the off-board sensor data can be communicated from off-board sensors 132a, 132b, and 132c to off-board sensor controller 136 via respective data paths 134a, 134b, and 134c.

Sensor data receiver module 112 in ride vehicle 102 can be configured to receive off-board sensor data from off-board sensor controller 136 in off-board sensor system 130 via data path 128 discussed above. As also shown in FIG. 1, sensor data receiver module 112 can also be configured to receive on-board sensor data from on-board sensor controller 110 in on-board sensor system 104 via data path 126. Data path 126 can be, for example, a physical connection such as a bus. For example, sensor data receiver module 112 can include an RF transceiver and one or more suitable memory devices for storing sensor data.

Sensor data fusion module 116 shown in FIG. 1 can be configured to receive the off-board sensor data and the on-board sensor data received in sensor data receiver module 112 via data path 114. Sensor data fusion module 116 can be further configured to perform a data fusion process on the off-board and on-board sensor data. The data fusion process can utilize various sensor fusion algorithms that are known in the art, such as a Kalman filter, to generate fused sensor data. Thus, the fused sensor data generated by sensor data fusion module 116 can be much more robust than either the off-board sensor data or the on-board sensor data taken alone.

As shown in FIG. 1, navigation module 120 can be configured to receive the fused sensor data from sensor data fusion module 116 to determine a course of ride vehicle 102 based on the fused sensor data. Navigation module 120, for example, can be configured to use the fused sensor data to generate a real-time map of the surrounding environment of ride vehicle 102 by implementing algorithms and mapping techniques that are known in the art. Moreover, one or more destinations of ride vehicle 102 can be programmed into navigation module 120, such that navigation module 120 is allowed to determine various courses, i.e., routes, to the one or more destinations. It is important to note that as ride vehicle 102 travels to a destination, navigation module 120 can be configured to constantly receive fused sensor data to detect obstacles that might be found in the surrounding environment of ride vehicle 102 and to adjust the course of ride vehicle 102 when necessary to avoid such obstacles, thereby ensuring the safety of the passengers in ride vehicle 102 as it travels.

As also shown in FIG. 1, ride vehicle control module 124 in ride vehicle 102 is in communication with navigation module 120 via data path 122. Ride vehicle control module 124 can be configured to receive control instructions from navigation module 120, which can be used by ride vehicle control module 124 to properly steer ride vehicle 102. Ride vehicle control module 124 can be further configured to adjust the speed of ride vehicle 102 and to enable ride vehicle 102 to travel in reverse, as required by the control instructions received from navigation module 120.

Figure 2:
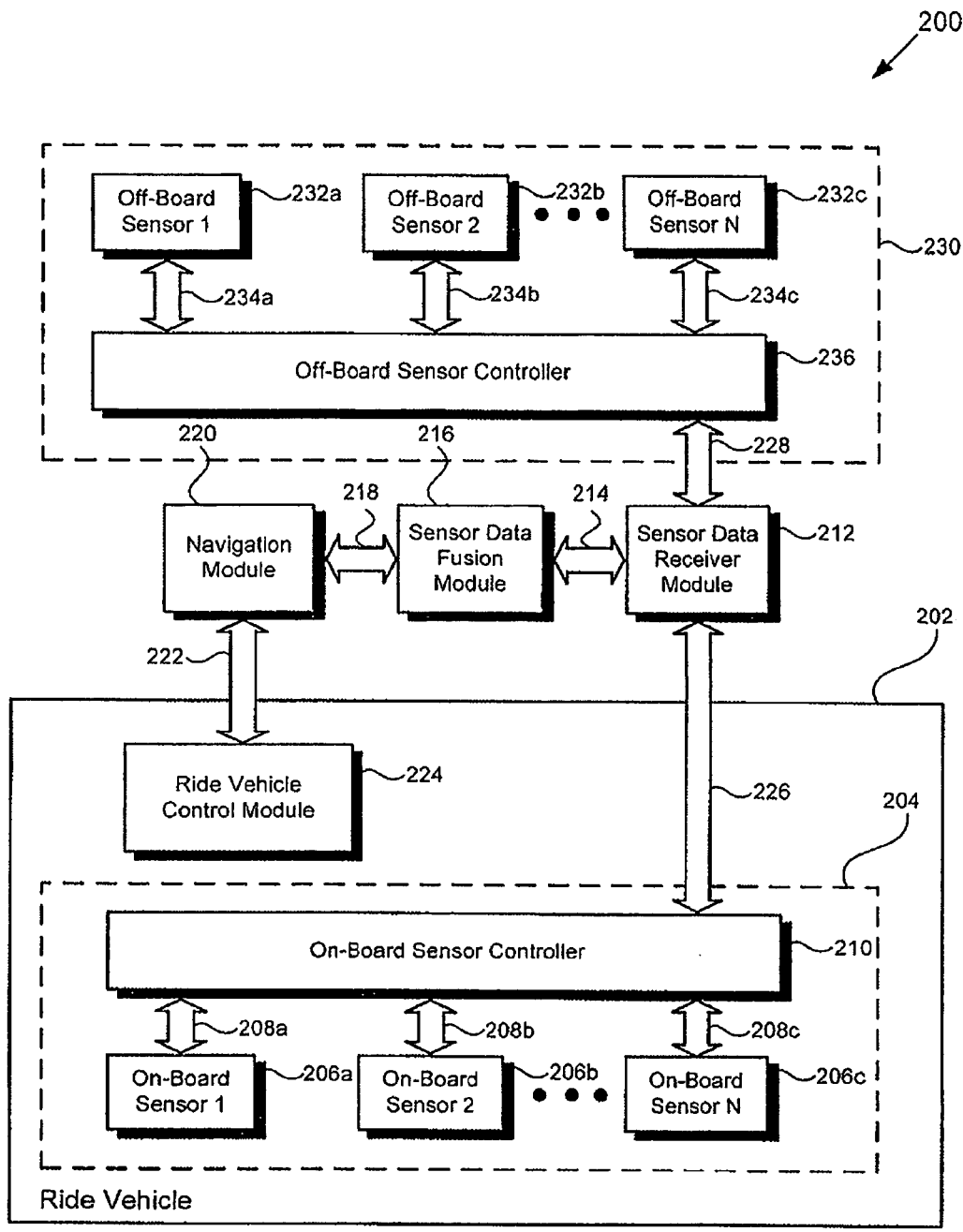
FIG. 2 illustrates a block diagram of an autonomous navigation system for use in a ride vehicle, in accordance with one embodiment of the present invention.

FIG. 2 illustrates a block diagram of autonomous navigation system 200 for use in a ride vehicle in accordance with one embodiment of the present invention. As shown in FIG. 2, autonomous navigation system 200 includes off-board sensor system 230, on-board sensor system 204, sensor data receiver module 212, sensor data fusion module 216, navigation module 220, and ride vehicle control module 224. In the embodiment of the invention shown in FIG. 2, on-board sensor system 204 and ride vehicle control module are situated in ride vehicle 202. As shown in FIG. 2, off-board sensor system includes off-board sensors 232a, 232b, and 232c coupled to off-board sensor controller 236 via respective data paths 234a, 234b, and 234c. As also shown in FIG. 2, on-board sensor system 204 includes on-board sensors 206a, 206b, and 206c coupled to on-board sensor controller 210 via respective data paths 208a, 208b, and 208c. In particular, ride vehicle 202, off-board sensors 232a, 232b, and 232c, off-board sensor controller 236, sensor data receiver module 212, sensor data fusion module 216, navigation module 220, ride vehicle control module 224, on-board sensors 206a, 206b, and 206c, and on-board sensor controller 210 in FIG. 2 correspond to ride vehicle 102, off-board sensors 132a, 132b, and 132c, off-board sensor controller 136, sensor data receiver module 112, sensor data fusion module 116, navigation module 120, ride vehicle control module 124, on-board sensors 106a, 106b, and 106c, and on-board sensor controller 110 in FIG. 1, respectively.

In the embodiment of the invention shown in FIG. 2, off-board sensor system 230, sensor data receiver module 212, sensor data fusion module 216, and navigation module 220 are situated apart from ride vehicle 202. As shown in FIG. 2, on-board sensor system 204 is in communication with sensor data receiver module 212 via data path 226. For example, datapath 226 can be a wireless communication link established using radio frequency signals. As also shown in FIG. 2, sensor data receiver module 212 is in communication with off-board sensor system 230 via data path 228. For example, datapath 228 can be a physical connection, such as a bus. As further shown in FIG. 2, sensor data receiver module 212 is in communication with sensor data fusion module 216 via data path 214, which is in further communication with navigation module 220 via data path 218. Navigation module 220 is in communication with ride vehicle control module 224 via data path 222. For example, data path 222 can be a wireless communication link established using radio frequency signals.

In system 200, on-board sensor system 204 can be configured to transmit on-board sensor data from on-board sensor controller 210 to sensor data receiver module 212 via data path 226. Sensor data receiver module 212 can also be configured to receive off-board sensor data from off-board sensor controller 236 in off-board sensor system 230 via data path 228. Sensor data fusion module 216 shown in FIG. 2 can be configured to receive the off-board sensor data and the on-board sensor data via data path 214 and can be further configured to perform a data fusion process on the off-board and on-board sensor data to generate fused sensor data as discussed above. Navigation module 220 can be configured to receive the fused sensor data from sensor data fusion module 216 via data path 218 and can be configured to determine a course of ride vehicle 202 based on the fused sensor data as described above.

Navigation module 220 can be configured to transmit control instructions to ride vehicle control module 224 via data path 222, which can be used by ride vehicle control module 224 to properly steer ride vehicle 202. Ride vehicle control module 224 can be further configured to adjust the speed of ride vehicle 202 and to enable ride vehicle 202 to travel in reverse, as required by the control instructions received from navigation module 220.

Figure 3:
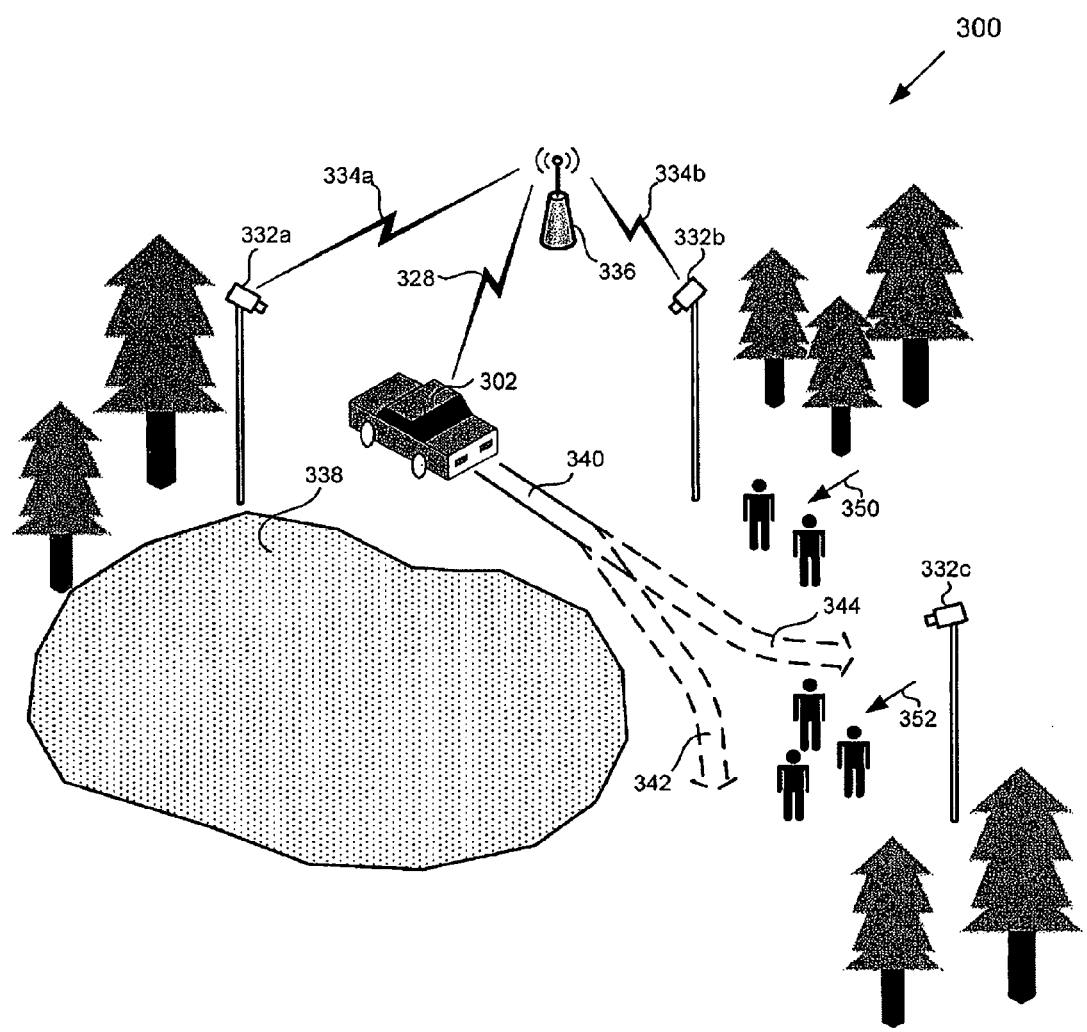
FIG. 3 illustrates an example of a surrounding environment of a ride vehicle, in accordance with one embodiment of the present invention.

FIG. 3 illustrates surrounding 300, which represents an example surrounding environment of ride vehicle 302. As shown in FIG. 3, surrounding 300 can include static objects, such as lake 338 and the various trees shown in FIG. 3, and dynamic objects, such as pedestrians 350 and 352. In particular, ride vehicle 302 in FIG. 3 corresponds to ride vehicle 102 in FIG. 1. As discussed above, ride vehicle 302 can include on-board sensor system 104, sensor data receiver module 112, sensor data fusion module 116, navigation module 120, and ride vehicle control module 124 shown in FIG. 1. As shown in FIG. 3, cameras 332a, 332b, and 332c can be situated at various locations in surrounding 300 to properly detect surrounding 300, i.e., the abovementioned static and dynamic objects included in surrounding 300. Cameras 332a, 332b, and 332c in FIG. 3 correspond to off-board sensors 132a, 132b, and 132c shown in FIG. 1.

As ride vehicle 302 navigates along path 340, for example, sensor data receiver module 112 (not shown in FIG. 3) in ride vehicle 302 can continuously receive off-board sensor data of surrounding 300 from cameras 332a, 332b, and 332c via wireless communication link 328 established with off-board sensor controller 336. In addition, sensor data receiver module 112 in ride vehicle 302 can also continuously receive on-board sensor data of surrounding 300 from on-board sensor system 104 as discussed above. As such, the autonomous navigation system of the present invention can immediately detect any changes in surrounding 300 to appropriately adjust the course of ride vehicle 302.

For example, as the autonomous navigation system of the present invention navigates ride vehicle 302 along path 340, any changes in location of pedestrians 350 and 352 can be immediately detected by the on-board and off-board sensor systems. Thus, if pedestrians move into the path of ride vehicle 302, the navigation system of the present invention can adjust the course of ride vehicle 302 by navigating ride vehicle 302 along course 342 or 344, thereby safely navigating ride vehicle around pedestrians 350 and 352. Moreover, if an alternative course is not available or possible, the navigation system of the present invention can immediately stop ride vehicle 302 to prevent a collision.

Figure 4:
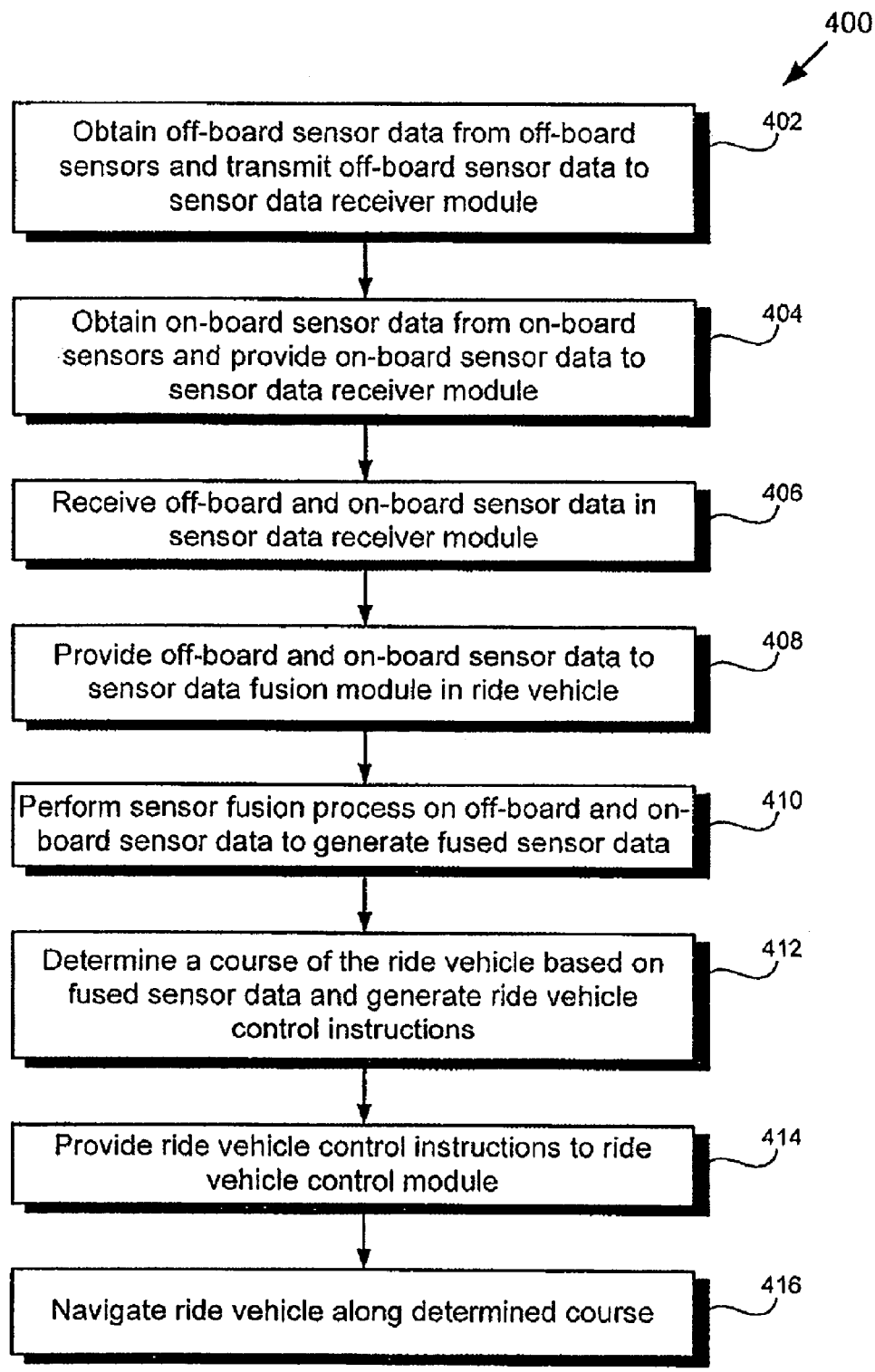
FIG. 4 illustrates a flow diagram of a method for use by a ride vehicle for enabling autonomous navigation, in accordance with one embodiment of the invention.

FIG. 4 illustrates a flow diagram of a method for use by a ride vehicle for enabling autonomous navigation in accordance with one embodiment of the invention. With reference to the embodiment of the invention shown in FIG. 1 and as shown in FIG. 4, at step 402 of flowchart 400, off-board sensor data is obtained from off-board sensors 134a, 134b, and 134c and transmitted to sensor data receiver module 112. At step 404, on-board sensor data is obtained from on-board sensors 106a, 106b, and 106c and provided to sensor data receiver module 112. At step 406, the off-board and on-board sensor data are received by ride vehicle 102 in sensor data receiver module 112.

Thereafter, at step 408, the off-board and on-board sensor data are provided to sensor data fusion module 116 in ride vehicle 102. At step 410, a sensor fusion process is performed on the off-board and on-board sensor data by sensor data fusion module 116 to generate fused sensor data. At step 412 of flowchart 400, a course of ride vehicle 102 is determined by navigation module 120 based on the fused sensor data and ride vehicle control instructions are generated. At step 414, the ride vehicle control instructions are provided to ride vehicle control module 124. Thereafter, at step 416, ride vehicle 102 is navigated along the course determined by navigation module 120.

Therefore, the invention enables autonomous navigation of a ride vehicle by implementing multiple independent sensor systems, i.e., on-board sensor system 104 and off-board sensor system 130, to detect a surrounding environment of the ride vehicle. Accordingly, the present invention advantageously utilizes highly robust fused sensor data to autonomously navigate the ride vehicle safely through a theme park. More importantly, since the present invention uses sensor data from multiple independent sensor systems, no single point of failure exists in detecting the surrounding environment of the ride vehicle, thereby substantially increasing the safety of passengers in the ride vehicle as well as the safety of pedestrians in the theme park. Thus, by enabling autonomous navigation of a ride vehicle through a theme park, the present invention can provide passengers of the ride vehicle with a different and unique experience with each ride. Moreover, since the present invention allows a ride vehicle to navigate safely through a theme park without requiring any tracks or rails, the present invention increases flexibility of ride vehicle operation environments in theme parks.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An autonomous navigation system for use in conjunction with a ride vehicle, said system comprising:
   an on-board sensor system for generating on-board sensor data of a surrounding of said ride vehicle, wherein said on-board sensor system is situated in said ride vehicle;
   a sensor data receiver module for receiving off-board sensor data of said surrounding from an off-board sensor system, wherein said off-board sensor system is situated apart from said ride vehicle;
   a sensor data fusion module for performing a data fusion process on said on-board sensor data and said off-board sensor data to generate fused sensor data;
   a navigation module for determining a course of said ride vehicle based on said fused sensor data.

2. The autonomous navigation system of claim 1 wherein said off-board sensor system comprises a plurality of off-board sensors and wherein said on-board sensor system comprises a plurality of on-board sensors.

3. The autonomous navigation system of claim 2 wherein each of said plurality of off-board sensors and each of said plurality of on-board sensors include at least one of a camera, a laser range-finder sensor, and a sound range-finder sensor.

4. The autonomous navigation system of claim 1 wherein said sensor data receiver module, said sensor data fusion module, and said navigation module are situated in said ride vehicle.

5. The autonomous navigation system of claim 4 further comprising a ride vehicle control module for controlling a speed and a direction of said ride vehicle based on control instructions received from said navigation module.

6. The autonomous navigation system of claim 1 wherein said sensor data receiver module, said sensor data fusion module, and said navigation module are situated apart from said ride vehicle, and wherein said on-board sensor system transmits said on-board sensor data to said sensor data receiver module.

7. The autonomous navigation system of claim 6 further comprising a ride vehicle control module for controlling a speed and a direction of said ride vehicle based on control instructions received from said navigation module.

8. An autonomous navigation system for use in conjunction with a ride vehicle, said system comprising:
   an off-board sensor system for generating off-board sensor data of a surrounding of said ride vehicle, wherein said off-board sensor system is situated apart from said ride vehicle;
   a sensor data receiver module for receiving said off-board sensor data;
   an on-board sensor system for generating on-board sensor data of said surrounding, wherein said on-board sensor system is situated in said ride vehicle;
   a sensor data fusion module for performing a data fusion process on said off-board sensor data and said on-board sensor data to generate fused sensor data;
   a navigation module for determining a course of said ride vehicle based on said fused sensor data.

9. The autonomous navigation system of claim 8 wherein said off-board sensor system comprises a plurality of off-board sensors coupled to an off-board sensor controller and wherein said on-board sensor system comprises a plurality of on-board sensors coupled to an on-board sensor controller.

10. The autonomous navigation system of claim 9 wherein each of said plurality of off-board sensors and each of said plurality of on-board sensors include at least one of a camera, a laser range-finder sensor, and a sound range-finder sensor.

11. The autonomous navigation system of claim 9 wherein said plurality of off-board sensors are situated over said ride vehicle.

12. The autonomous navigation system of claim 8 wherein said sensor data receiver module, said sensor data fusion module, and said navigation module are situated in said ride vehicle.

13. The autonomous navigation system of claim 8 wherein said sensor data receiver module, said sensor data fusion module, and said navigation module are situated apart from said ride vehicle.

14. The autonomous navigation system of claim 8 further comprising a ride vehicle control module for controlling a speed and a direction of said ride vehicle based on instructions received from said navigation module.

15. A method for use by a ride vehicle for enabling autonomous navigation, said method comprising:
   receiving off-board sensor data in a sensor data receiver module, wherein said off-board sensor data is generated from an off-board sensor system situated apart from said ride vehicle;
   providing on-board sensor data to said sensor data receiver module, wherein said on-board sensor data is generated from an on-board sensor system situated in said ride vehicle;
   fusing said off-board sensor data and said on-board sensor data to generate fused sensor data; and
   navigating said ride vehicle based on said fused sensor data.

16. The method of claim 15 wherein said off-board sensor system comprises a plurality of off-board sensors and wherein said on-board sensor system comprises a plurality of on-board sensors.

17. The method of claim 16 wherein each of said plurality of off-board sensors and each of said plurality of on-board sensors include at least one of a camera, a laser range-finder sensor, and a sound range-finder sensor.

18. The method of claim 15 wherein said sensor data receiver module is situated in said ride vehicle.

19. The method of claim 15 wherein said navigating further comprises determining a course of said ride vehicle based on said fused sensor data.

20. The method of claim 15 wherein said navigating further comprises controlling a speed and a direction of said ride vehicle.

* * * * *